(12) United States Patent
Prakash et al.

(10) Patent No.: US 9,405,794 B2
(45) Date of Patent: Aug. 2, 2016

(54) INFORMATION RETRIEVAL SYSTEM

(71) Applicant: Scaligent Inc., Redwood City, CA (US)

(72) Inventors: Amit Prakash, Redwood City, CA (US); Ajeet Singh, Redwood City, CA (US); Priyendra Singh Deshwal, Redwood City, CA (US); Joy Dutta, Redwood City, CA (US); Shashank Gupta, Redwood City, CA (US); Vijay Krishnan Ganesan, Redwood City, CA (US); Abhishek Rai, Redwood City, CA (US); Sanjay Agrawal, Redwood City, CA (US); Vibhor Nanavati, Redwood City, CA (US); Stephane Antonin Kiss, Redwood City, CA (US)

(73) Assignee: THOUGHTSPOT, INC., Redwood City, CA (US)

( * ) Notice: Subject to any disclaimer, the term of this patent is extended or adjusted under 35 U.S.C. 154(b) by 218 days.

(21) Appl. No.: 13/944,491

(22) Filed: Jul. 17, 2013

(65) Prior Publication Data

US 2015/0026145 A1     Jan. 22, 2015

(51) Int. Cl.
    *G06F 17/30*     (2006.01)
(52) U.S. Cl.
    CPC ...... *G06F 17/30401* (2013.01); *G06F 17/3053* (2013.01); *G06F 17/30864* (2013.01)
(58) Field of Classification Search
    CPC .................. G06F 17/30864; G06F 17/30867; G06F 17/30401
    USPC .................................. 707/706, 707, 769, 770
    See application file for complete search history.

(56) References Cited

U.S. PATENT DOCUMENTS

| | | | |
|---|---|---|---|
| 2005/0027717 A1* | 2/2005 | Koudas et al. | 707/100 |
| 2005/0289124 A1 | 12/2005 | Kaiser et al. | |
| 2008/0109422 A1* | 5/2008 | Dedhia | 707/5 |

(Continued)

FOREIGN PATENT DOCUMENTS

| | | |
|---|---|---|
| EP | 268367 | 5/1988 |
| EP | 1587011 | 10/2005 |
| WO | 0141002 | 6/2001 |

OTHER PUBLICATIONS

Mayssam Sayyadian et al., Efficient Keyword Search Across Heterogeneous Relational Databases, 2007, IEEE, 346-355.*

(Continued)

*Primary Examiner* — Jean B Fleurantin
(74) *Attorney, Agent, or Firm* — Schwabe, Williamson & Wyatt, PC

(57) ABSTRACT

An information retrieval system converts unstructured ad-hoc search queries into structured search instructions that retrieve data in a structured relational database or an unstructured database. Data from the database is uploaded into a distributed in-memory database system. Tokens are automatically generated based on attributes, measures, and other metadata extracted from the relational database. The tokens are then compared with the non-structured ad-hoc user search queries. The information retrieval system uses the tokens to identify or predict what structured data is associated with user search queries. The tokens guide the user through a set of search terms that the system then uses to generate the structured query instructions. The structured query instructions retrieve specific data and answers from in the database system.

18 Claims, 13 Drawing Sheets

(56) References Cited

U.S. PATENT DOCUMENTS

2009/0019019 A1* 1/2009 Jones et al. ............... 707/4
2011/0113048 A1* 5/2011 Njemanze ............... 707/755

OTHER PUBLICATIONS

Ping Wu et al: "Towards keyword-driven analytical processing", Proceedings of the 2007 ACM Sigmod Internationl Conference on mnanagement of Data, Sigmo '07, Jun. 12, 2007, p. 617.

Anonymous: "File system permission—Wikipedia, the free encyclopedia." Jun. 11, 20103 (Jun. 11, 2013); URL: http://en.wikipedia.org/w/index/php?title_File_system_permissions&oldid=559455322 [retrieved on May 11, 2014]; pp. 4-5.

Lei Shi et al.: "50x Faster: Sppeding up an SQL-based legacy sytem with few changes", Oct. 4, 2011 Retrieved from Internet: URL: http://www.user.tu-berline.de/komm/CD/paper/040221.pdf [retrieved on Jun. 11, 2014].

Gouliang Li et al: "Efficient type-ahead search on relational data: a TASTIER approach", Sigmod-Pods '09: Compilation Proceedings of the International Conference on management Data & 28th Symposium on Principles of Database Systems; Providence, RI, USA, Association for Computing Machiner, New York NY Jun. 29, 2009, pp. 695-706.

Lukas Blunschi et al: "Soda Generating SQL for Business Users", Proceedings of the VLDB Endowment, vol. 5, No. 10, Aug. 27, 2012 pp. 932-935.

Akashana Baid et al: "Toward scalable keyword search over relational data", Proceedings of the VLDS Endowment, vol. 3, No. 1-2, Sep. 1, 2010, pp. 140-0149.

Jajodia S et al., "Flexible support for multiple access control policies", ACM Transactions on Database Systems, ACM New York, NY, USA, vol. 26, No. 2, Jun. 1, 2001, pp. 217-228.

International Search Report and Written Opinion for PCT/US14/39230; Date of mailing Nov. 24, 2014.

* cited by examiner

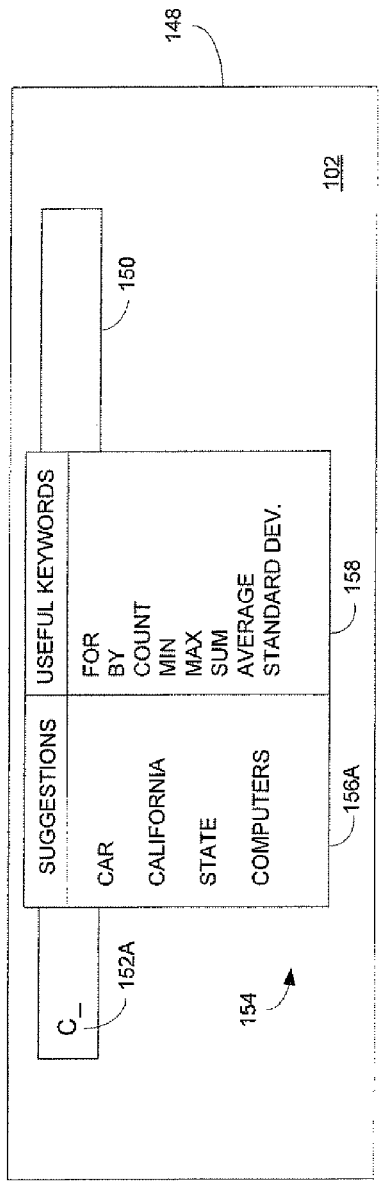

| STATE ID | REVENUE (MEASURE) |
|---|---|
| 4 | $23,000 |
| 5 | $5,993 |
| 3 | $54,000 |
| 4 | $16,905 |
| 5 | $134,000 |
| 6 | $54,732 |
| 2 | $4,500 |
| ... | ... |

MEASURE COLUMN (REVENUE)

| STATE ID | STATE NAME (ATTRIBUTE) |
|---|---|
| 1 | ALABAMA |
| 2 | ALASKA |
| 3 | ARIZONA |
| 4 | ARKANSAS |
| 5 | CALIFORNIA |
| 6 | COLORADO |
| 7 | CONNECTICUT |
| ... | ... |

ATTRIBUTE COLUMN (STATE)

FIG. 3

INFORMATION RETRIEVAL SYSTEM

BACKGROUND

Enterprises need to access specific business intelligence (BI) information. Business intelligence (BI) is a set of theories, methodologies, processes, architectures, and technologies that may transform raw data into meaningful and useful information for business purposes. BI may handle large amounts of information to help identify and develop new opportunities. Making use of new opportunities and implementing an effective strategy can provide a competitive market advantage and long-term stability.

Business intelligence software tools attempt to automate the process of translating raw data sitting in relational databases into meaningful information that a business decision maker can use. However, the creation of new reports is often complex and involves several Information technology (IT) specialists. A business user first may need to fill out a form that describes what data to provide in a BI report. The form is taken to an information technology (IT) specialist who generates the correct relational database management system (RDBMS) queries and then creates reports from on the query results. The process of the business user specifying what data to retrieve and then getting the final report back from the IT specialist can often take several weeks. Existing database solutions may not be fast enough to provide an interactive business user experience when large volumes of data need to be processed.

Internet search engines are designed to search through documents and help users formulate questions. However, Internet search engines are not aware of the relationships that exist in typical relational databases. Internet search queries only perform simply string matches and do not have the intelligence to perform searches on structured data and correlate/aggregate/filter the search results.

BRIEF DESCRIPTION OF THE DRAWINGS

FIGS. 2A-2C depict example states of a user search query.
FIG. 3 depicts example columns within an in-memory database system.

DETAILED DESCRIPTION

An information retrieval system converts unstructured ad-hoc search queries into search instructions that retrieve data from a structured relational database. A guided ad-hoc search engine allows most business users to express search requirements by just typing a few words. A high performance distributed in-memory database with a novel query execution engine computes results for relational database queries significantly faster than current BI systems, enabling interactive response times.

Data from the relational database, or from any other structured or unstructured data source, is uploaded into a distributed in-memory database system (database system). Tokens are automatically generated based on content, attributes, measures, and other metadata extracted from the relational database and any other structured or unstructured data sources. The tokens are identified and displayed in response to user inputs and may be any word, phrase, set of characters, symbols, etc. associated with data that exists in the database system.

The tokens guide the user through a selection of search terms that the retrieval system can then use to generate the structured query instructions. The structured query instructions retrieve specific data in the database system. Thus, data can be retrieved from a relational database in response to non-structured search queries.

The information retrieval system determines and/or may predict what structured data is associated with the user inputs. Search suggestions and search data may be retrieved and displayed before the user even completes entering a search term or completes the search query. The suggestions and data help guide the user to relevant data that exists in the relational database.

The retrieval system may use a ranking-based prediction of the user inputs and fetch corresponding results. For example, the user may start entering characters for a search query requesting sales data for California. Based on the initial characters, the information retrieval system determines or predicts the user is looking for sales data. The information retrieval system then may display suggested search terms for accessing different types of sales data and may initiate a preliminary search to retrieve and display sales data for different sales regions.

The preliminary search may display the precise information the user was initially searching for. In other situations, the preliminary search may display other helpful information that the user did not know existed, that the user would not have normally requested, or that helps the user locate the correct information.

Figure 1:
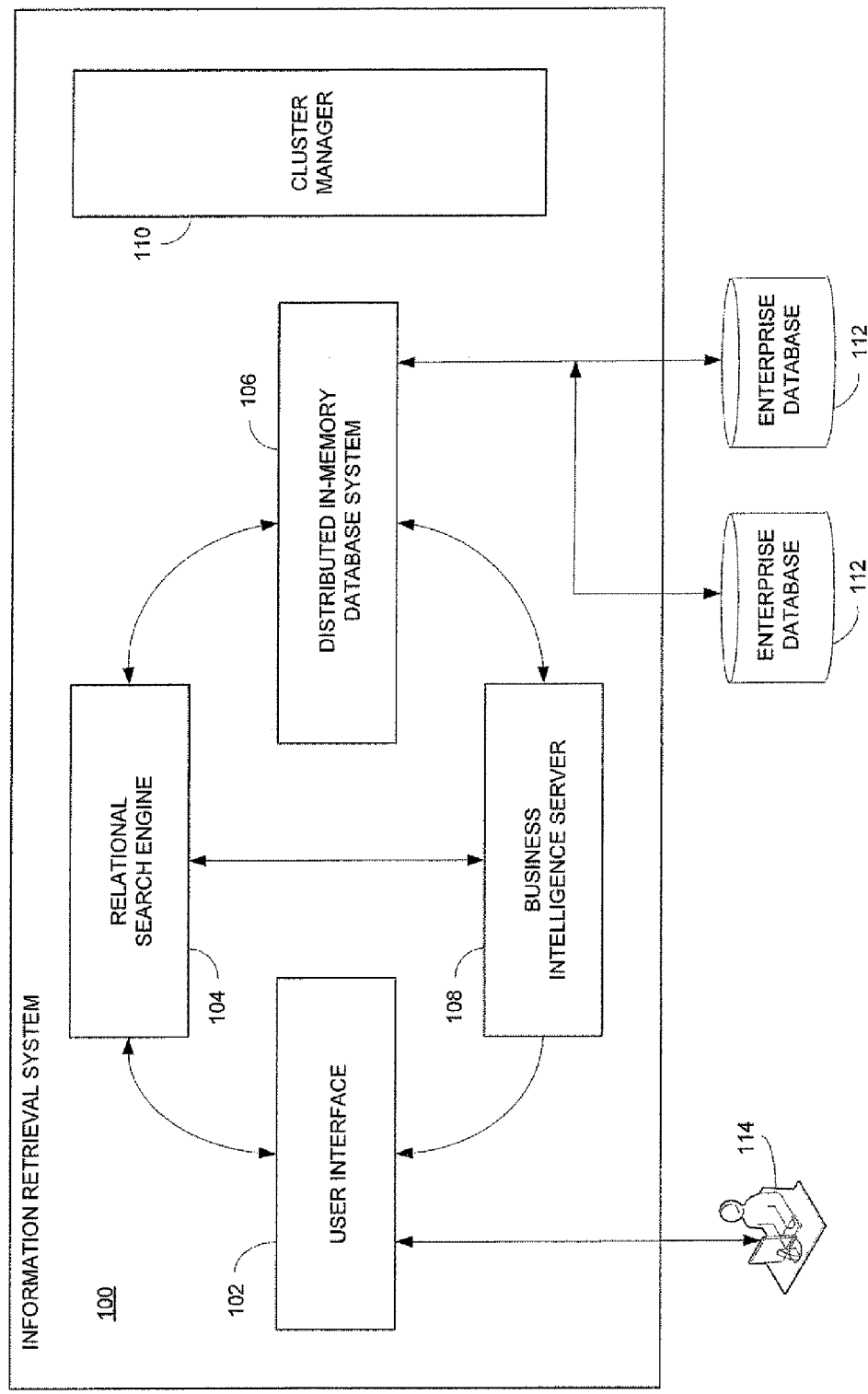
FIG. 1 depicts an example information retrieval system.

FIG. 1 depicts an example information retrieval system 100 (retrieval system). Retrieval system 100 may comprise an array of local and/or cloud-based computing and storage devices, such as servers, database systems and/or any other computing logic. The different computing devices and database systems within retrieval system 100 may be coupled together via one or more buses or networks. The buses or networks may comprise local area networks (LANs), wide area networks (WANs), fiber channel networks, Internet networks, or the like, or any combination thereof. A user may use computing device 114 to access retrieval system 100. Computing device 114 may comprise a personal computer, computer terminal, mobile device, smart phone, electronic notebook, or the like, or any combination thereof.

Retrieval system 100 may upload content from one or more structured relational databases 112 and/or unstructured databases 112. Databases 112 may contain business intelligence (BI) information for an enterprise. The BI information may include sales data, revenue data, profit data, tax data, or the like, or any combination thereof. However, this is just one example, and retrieval system 100 may upload, store, search, process, retrieve and/or display any type of information, data, or content from any storage system operated by any entity.

Retrieval system uploads data from database 112 into a distributed in-memory database system 106 (database system). In one example, database system 106 may comprise dynamic random access memory (DRAM), Flash memory, disc memory, or any other type of data storage medium with relatively fast data access. In one example, the uploaded data is stored in a column structure and assigned additional metadata identifying particular data parameters and relationships. For example, retrieval system 100 may identify different characteristics of the data such as, attributes, measures, values, unique identifiers, tags, links, column and row keys, etc. Retrieval system 100 then generates tokens based on the data characteristics and associates the tokens with different columns in database system 106.

A relational search engine 104 loads the tokens into indexes. For example, a column in database system 106 may contain revenue data. Retrieval system 100 may generate a token comprising the word "revenue" and search engine 104 may load the token into an index that compares user inputs with the letters in the word revenue.

Search engine 104 may contain state machines that guide the user into using search terms associated with the data and data structures contained in database system 106. Search engine 104 also initiates search queries based on different states of the user query. For example, the state machines may initiate a structured search query in response to identifying a user input requesting revenue data (measure column) for a state (attribute column).

Attributes may comprise any data characteristic, category, content, etc. that in one example may be non-quantifiable or non-numeric. Measures may comprise quantifiable numeric values such as sizes, amounts, degrees, etc. For example, a first column containing the names of states may be considered an attribute column and a second column containing the numbers of orders received for the different states may be considered a measure column.

Search engine 104 displays different tokens and data associated with current states of the user inputs. Again, the tokens may be associated with the structured tables or columns loaded into database system 106. The tokens help guide the user into using search terms that refer to specific structured data within database system 106. For example, retrieval system 100 may bind the user into using tokens that are associated with data that currently exists within database system 106. This prevents the user from generating search queries for data that does not exist in database system 106 and from using invalid search terms that can not be linked with the data in database system 106.

The user also may enter valid search terms that have no corresponding data in database system 106. Retrieval system 100 may generate a response that indicates no data exists for the search query. For example, the search term may request the number of orders received for the month of July in California. The database system may contain columns for orders and California. However, the columns may have no orders for the month of July from California. The retrieval system may generate a response that indicates that no orders were received for the month of July from California.

A user of computing device 114 accesses user interface 102 via a web browser or a web application. The user enters characters into a search field within user interface 102. Search engine 104 compares the characters with the tokens previously generated from the structured relational data in database system 106. Search engine 104 may display suggested tokens to the user before the user completes the search query. For example, search engine 104 may display a revenue token immediately after the user enters the letter R. If relevant, the user may select the displayed revenue token. Otherwise, the user may enter additional characters into the search field and search engine 104 may compare the additional characters with the tokens.

Search engine 104 may use ranking algorithms before displaying the tokens to the user. In other words, search engine 104 may try to predict what structured data in database system 106 is associated with the user inputs. For example, there may be hundreds of different tokens associated with the letter R. Search engine 104 may rank the tokens and initiate a search query based on the ranking. Token ranking may be based on usage, data dimensions, or any other criteria.

For example, a first token may be associated with a first column in the database system having four values and a second token may be associated with a second column in the database system having hundreds of values. Search engine 104 may rank the first token higher than the second token, since the fewer number of values in the first column may have a higher likelihood of containing the correct data. Search engine 104 also may rank the tokens based on how frequently associated columns have been accessed in prior search queries.

Search engine 104 initiates a search query by sending a search object to a business intelligence server 108 (BI server). Search queries may be initiated before, during and/or after search terms are entered into the search field. For example, search engine 104 may send a search object to BI server 108 after the user enters a few characters into user interface 102. Search engine 104 may initiate other search queries and send associated search objects to BI server 108 after additional characters are entered for the user search query.

BI server 108 generates instructions based on the search objects received from search engine 104. In one example, the instructions comprise SQL-like queries. However, other query formats also may be used. Database system 106 sends data back to BI server 108 in response to the search instructions. The search object and associated structured search instructions also may direct database system 106 to perform different operations. For example, the structured search instructions may request database system 106 to join different columns and sum together different data in the columns.

BI server 108 receives data back from database system 106 in response to the structured search instructions and displays the data within user interface 102. As mentioned above, the data may be displayed before the user completes entering a search term. For example, after the user inters the letter R, search engine 104 may identify a revenue token and send an associated search object to BI server 108. BI server 108 may generate structured search instructions based on the search object that retrieve content from database system 106 associated with the revenue token. BI server 108 receives the associated revenue data from database system 106 and displays the revenue data within user interface 102.

Database system 106 may comprise a distributed processing system that uses multiple database workers. One of the database workers may be selected as a query coordinator for a given query. The query coordinator may generate a query plan instructing the database workers how to process respective portions of data. The query coordinator and the other database workers process associated portions of data based on the query plan. The different database workers then send results back to the query coordinator for final centralized data processing. The final results are then sent to BI server 108.

In another example, the database workers might send intermediate results to each other for further processing. This "shuffling" of intermediate results can be performed multiple times and the workers may send final results to the coordinator for final consolidation.

A cluster manager 110 manages the configuration and distribution of processes within retrieval system 100. For example, cluster manger 110 may assign user interface 102, search engine 104, BI server 108, and associated backup processes, to different computing devices within retrieval system 100. Cluster manager 110 also may assign the different database workers to different computing devices.

FIG. 2A depicts an example user interface 102 operated by the information retrieval system. This is just one example of a variety of different ways data may be presented to a user. User interface 102 may display an electronic page 148 within a web browser or other mobile or desktop application. A user may use computing device 114 in FIG. 1 to enter a search term 152A into a search field 150 within electronic page 148.

The retrieval system may display a menu 154 including a first list of tokens 156A alternatively referred to as suggestions. Menu 154 also may include a second list of operators 158 alternatively referred to as useful keywords. The retrieval system may display some tokens 156A as soon as the user mouse clicks within search field 150 and before the user enters any characters into search field 150. For example, an initial set of tokens 156A may be associated with the most frequently used search queries or the most frequently accessed data.

Operators 158 may determine how search results are retrieved and displayed. A "for" operator 158 may direct the retrieval system to retrieve and display data for a particular attribute or category of search data, such as "revenue data for cars." A "by" operator 158 may direct the retrieval system to group an identified category of search data by a particular sub-category, such as "revenue by year."

If operators are not specified, the retrieval system may automatically figure out the operator from the context. For example, the user may enter the search terms "revenue state." The retrieval system may interpret the search term as "revenue by state" since state is the name of a column. In another example, the user may enter the search term "revenue California." The retrieval system may interpret the search term as "revenue for California" since California is a value in a column and is not the name of the column.

Operators 158 also may include mathematical functions. For example, a count operator 158 may direct the retrieval system to display the number of an identified type of data, and minimum and maximum operators 158 may direct the retrieval system to display minimum and maximum values for the data, respectively. A summation (sum) operator 158 may direct the retrieval system to add up a total value for the data, an average operator 158 may direct the retrieval system to calculate an average value for the data, and a standard deviation (std. dev.) operator 158 may direct the retrieval system to calculate a standard deviation for the data. The retrieval system also may use other types of operators 158.

The retrieval system may repeatedly update tokens 156A in response to any combination of characters or terms entered into search field 150. For example, the user may initially enter the character C into search field 150. The search engine may identify and display a first set of tokens CAR, CALIFORNIA, STATE, and COMPUTERS. Since California is an entry in a column associated with the name state, the retrieval system also may display STATE as one of the tokens. Simultaneously, the search engine may initiate a structured search query for data in the database system associated with the displayed tokens.

The user may enter a second character A into search field 150. The search engine may identify and display a new second set of tokens CAR and CALIFORNIA. At the same time, the search engine may refine the previously structured search query for data in the database system associated with the second set of displayed tokens.

FIG. 2B shows another state of user interface 102 after a user has completed entry of a search term 152B. The user may type in search term 152B or the user may have selected the associated CALIFORNIA token 156A previously displayed in menu 154 of FIG. 2A. The retrieval system may initiate another search in response the user entering the complete CALIFORNIA token into search field 150.

The retrieval system may automatically update tokens 156B to correspond with search term 152B. For example, columns in the database system associated with tokens 156B may be linked to the column in the database system associated with the CALIFORNIA token. For example, REVENUE, YEAR, PART, TRANSACTION, AND WIDGET columns in the database system may be linked to the CALIFORNIA column in the database system. The retrieval system may display tokens 156B associated with the REVENUE, YEAR, PART, TRANSACTION, AND WIDGET columns.

The retrieval system may rank tokens based on the state of the search query, data usage, data dimensions, or user preferences. For example, the retrieval system may have identified dozens of tokens associated with the CALIFORNIA token. The retrieval system may have given the REVENUE token 156B a highest ranking. Accordingly, the retrieval system may display the REVENUE token 156B in menu 154 and may display associated revenue data for the state of California within a graph 164. The retrieval system also may display total revenue for the state of California within a display box 160.

The retrieval system also may display filters 162 based on the data associated with search term 152B. For example, filters 162 may identify other revenue data associated with other geographic regions.

Figure 2C:
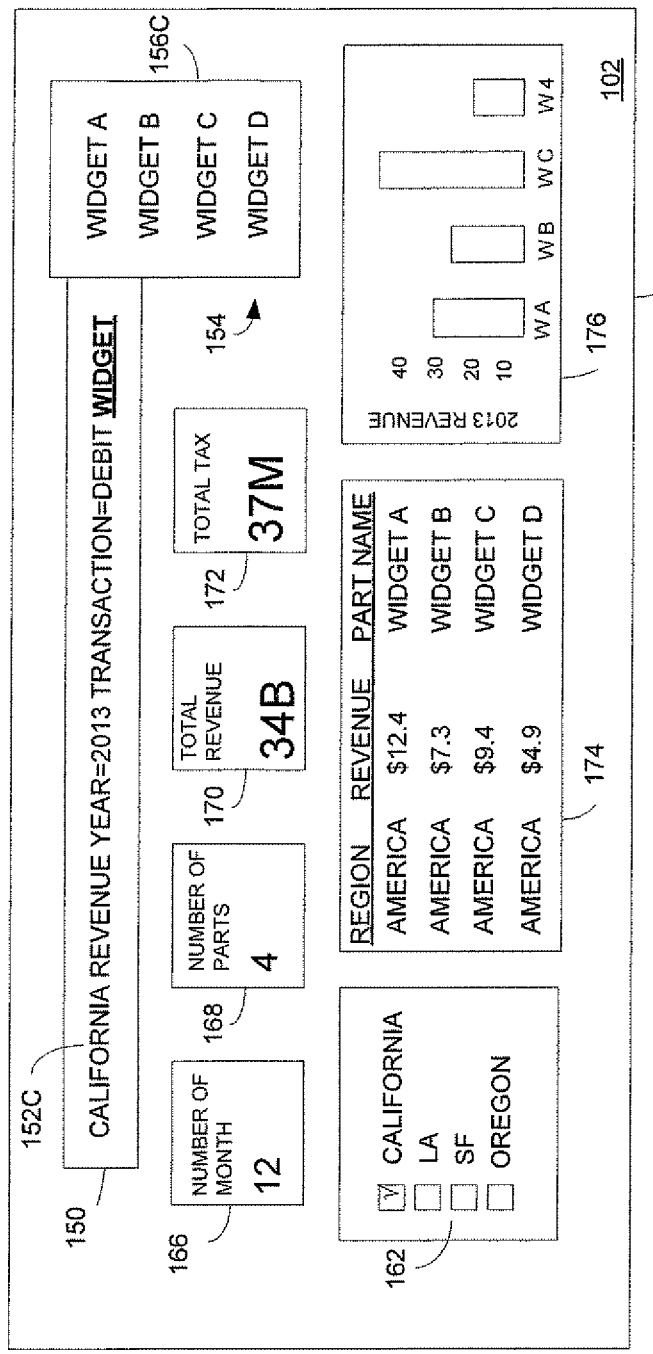

FIG. 2C depicts yet another state of a user search query where additional parameters have been added to form search term 152C. For example, a year value, a transaction value, and a product type have been added to search term 152C. The retrieval system may identify a new refined set of tokens 156C and also refine the search query and/or the displayed data in response to the additional parameters in search term 152C. For example, the retrieval system may display the revenue data for California, for year 2013, for debit transactions, and for different types of widgets.

The retrieval system also may display a time period 166, a number of parts 168, a total revenue 170, and a total tax 172 within a headline view associated with search term 152C. Of course these are only examples of any data that may be extracted from the database system and displayed within user interface 102. The retrieval system also may display other tables 174 and graphs 176 associated with the retrieved data.

In one example, the retrieval system may automatically determine a best format for displaying the data. For example, the data associated with a search term may comprise a large range of values for a limited number of attribute categories. The retrieval system may decide a bar graph similar to graph 176 is the best way to display the data.

The retrieval system may determine the number of measures, number of attributes, and number of values associated with the data and present data based on these data dimensions. The retrieval system may use other formats for displaying data, such as bubble charts, line graphs, pie charts, or the like, or combinations thereof, based on the dimensions of the associated tables or columns in the database system.

FIG. 3 depicts an example of columns that may be uploaded from the enterprise database 112 into in-memory database system 106 of FIG. 1. Columns 180 and 186 are representations of data that may have been extracted from a structured relational database system, such as a relational database management system (RDBMS) or from unstructured data.

In this example, column 180 contains names of states and column 186 contains revenue for different states. Metadata and other information associated with columns 180 and 186 also may have been extracted from enterprise database 112 or generated by the information retrieval system.

For example, the retrieval system may generate a token with the name "state" and associate the state token with column 180. The retrieval system also may have classified the state token and associated column 180 as an attribute. The retrieval system may identify or generate other metadata and links with the state token and column 180. For example, state identifiers 182 may be assigned to each entry in column 180. The retrieval system also generates a revenue token and associates the revenue token with revenue column 186.

Column 180 may contain different state names 184 and associated identifiers 182. For example, the state name Alabama has an associated identifier 1 and the state name California has an associated identifier 5. Identifiers 182 link column 180 with column 186. For example, identifier 4 in column 186 associates the revenue data $23,000 with the state name Arkansas in column 180.

The retrieval system uses identifiers 182 to associate tokens and columns with other tokens and columns. For example, a user may enter the search term "California." The retrieval system may identify the name California in column 180 and identify the associated state identifier 5.

The retrieval system may use the state identifier 5 to identify associated revenue data in column 186. For example, the retrieval system may determine that the California attribute in column 180 has associated revenue measures of $5,993 and $134,000 in column 186. The retrieval system may identify a revenue token associated with column 186 and display the revenue token and/or display the revenue measures in the user interface.

Figure 4:
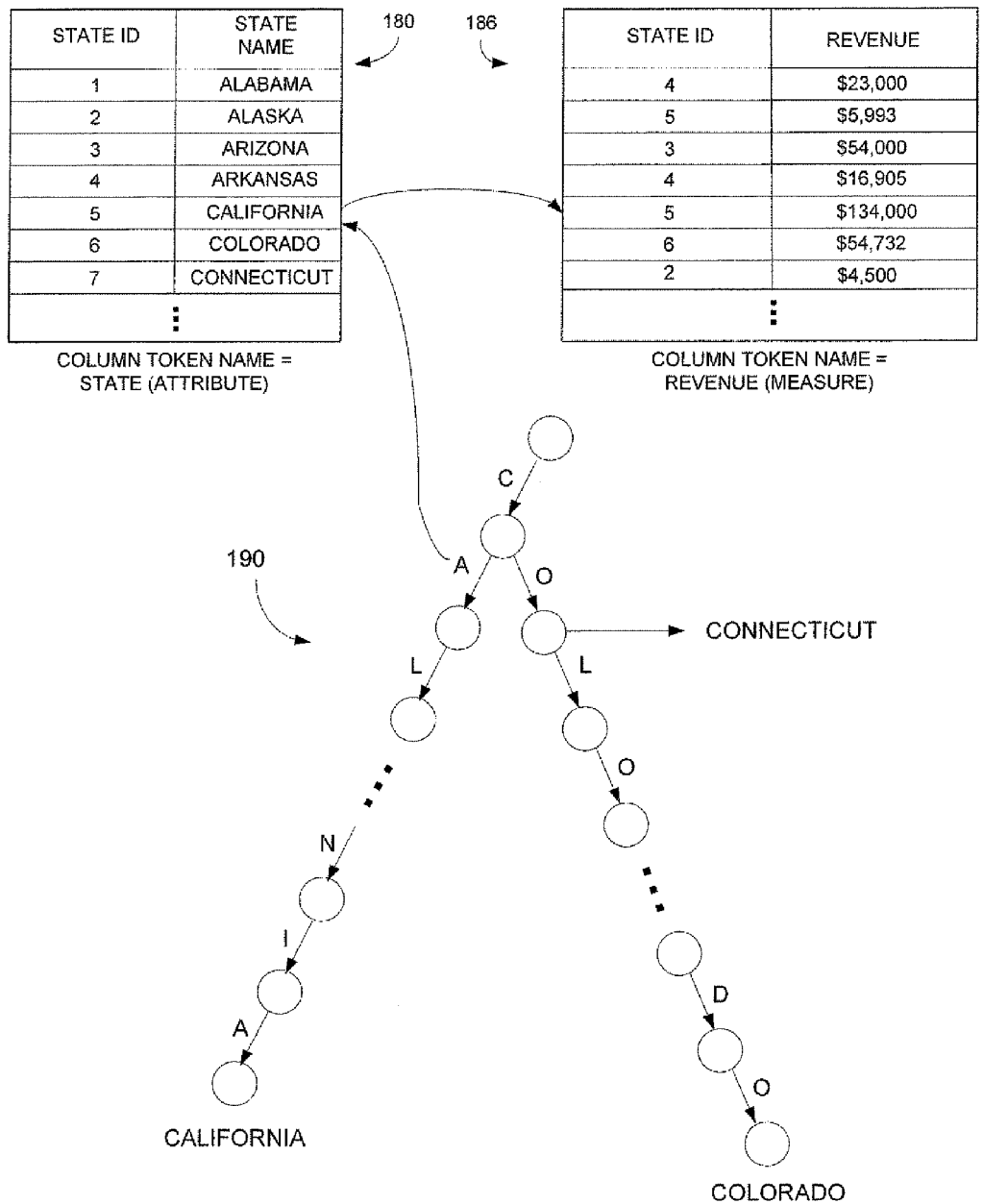
FIG. 4 depicts an example index used by a search engine.

FIG. 4 depicts an example of how the search engine may associate non-structured user inputs with columns in a relational database system. The retrieval system may generate different indexes based on the database tables uploaded from the enterprise relational database or based on any other structured or unstructured data uploaded from the enterprise database. For example, the retrieval system may generate an index 190 that identifies the names of states contained in column 180.

The retrieval system may identify three different state names California, Colorado, and Connecticut in column 180 in response to the user entering the letter C into the search field. The retrieval system not only associates the letter C with the three state names in column 180 but also may associate the user input C with revenue column 186 via state identifiers 5, 6, and 7. Thus, from the user input C, the search engine also may anticipate or predict that the user is searching for revenue data for California, Colorado, or Connecticut.

The retrieval system may display tokens, attributes, and/or measures associated with the user input C. For example, the retrieval system may display a revenue token associated with column 186, display a state token associated with column 180, and/or display state name tokens associated with individual state names in column 180.

In response to the user input C, the retrieval system also may initiate a search for the revenue data associated with California, Colorado, and Connecticut. The retrieval system may generate structured search instructions that retrieve the revenue data from column 186 for California, Colorado, and Connecticut. The retrieval system then may display the revenue data within the user interface.

Index 190 moves into a second logic state after the user enters a second letter A. The retrieval system now may anticipate/predict that the user is searching for data related to California. In response to detecting the second index logic state, the retrieval system may refine the data displayed in the user interface. For example, the retrieval system may display total revenue of $139,993 for California. The retrieval system also may display other data associated with California. For example, the retrieval system may identify other columns in the database system containing state identifier 5 and display tokens and/or data associated with the identified columns.

Figure 5:
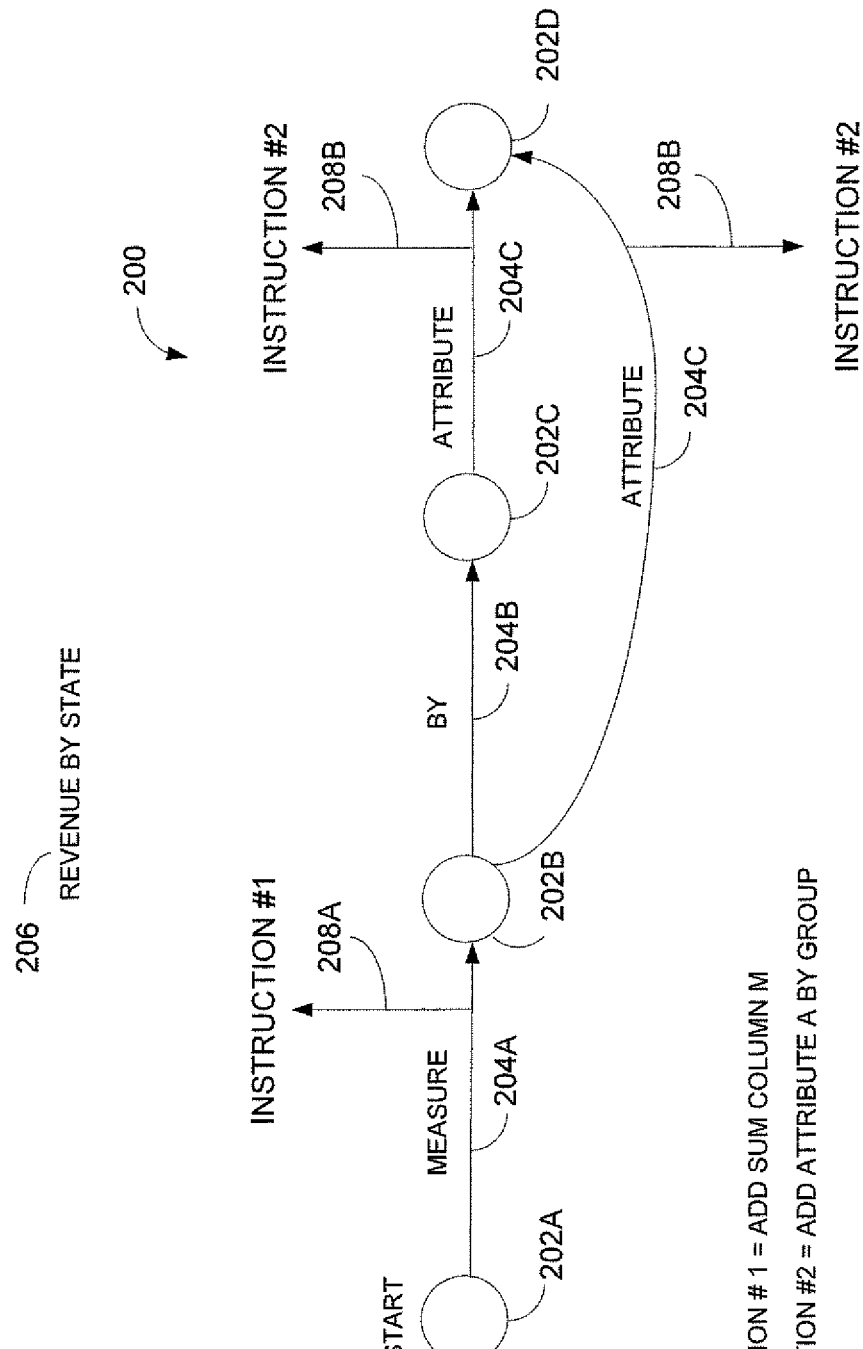
FIG. 5 depicts an example state machine used by the search engine.

FIG. 5 depicts an example finite state machine 200 used by the retrieval system. Finite state machine 200 may be implemented in any combination of hardware and/or software. Of course FIG. 5 is just one example and many different state machines may be operated by the retrieval system. In this example, the user may enter the search term 206 "revenue by state" into the search field of the user interface.

State machine 200 transitions into different logic states based on detecting different portions of search term 206. For example, state machine 200 may transition from logic start state 202A to logic state 202B in response to identifying the search term "revenue." As described above, a revenue token may have been generated for a column of data containing revenue data. The revenue token may have been classified as a measure. The revenue token may have been loaded into an index and the index may have been compared and matched the revenue token with the user input.

State machine 200 may transition from logic state 202B to logic state 202C in response to the user entering a "by" operator. State machine 200 may display the "by" operator as one of operators 158 described above in FIGS. 2A-2C.

State machine 200 may transition from state 202C to state 202D in response to detecting attribute 204C. Similar to measure 204A, a token comprising the word "state" may have been generated for a column of data containing names of states. The state token may have been classified as an attribute. The state token may have been loaded into an index and the index may have compared and matched the state token with the second part of search term 206 ("state"). State machine 200 transitions from logic state 202C to logic state 202D in response to detecting state in search term 206.

In this example, state machine 200 may transition from logic state 202B directly to logic state 202D in response to detecting attribute 204C. Thus, the user does not have to enter the "by" operator in order to complete the search query.

State machine 200 may display tokens and initiate search queries based on any logic states 202A-202D. For example, state machine 200 may display the revenue token in the user interface after a certain number of letters of the word revenue are detected in search term 206. The user then may select the displayed revenue token or may manually type the word revenue into the search field.

State machine 200 may display the state token within the user interface in response to transitioning to logic state 202B. As explained above, a state identifier may link the revenue column with the state column. Thus, the system may suggest or predict "state" as a possible attribute to follow the search term "revenue by" or to follow the search term "revenue."

Logic state 202D may indicate a completed search request for a defined set of data that exists within the in-memory database.

The retrieval system also may generate annotations and initiate search queries in response any of the logic state transitions. For example, the retrieval system may generate a first instruction 208A in response to transition of state machine 200 from logic state 202A to logic state 202B. Instruction 208A may request a summation of the column associated with measure 204A. For example, instruction 208A may request a summation of all revenue data in the revenue column. The search engine then may initiate a preliminary search query by sending a search object to the BI server that contains instruction 208A.

State machine 200 may generate a second instruction 208B in response to the transition to logic state 202D. Instruction 208B may request grouping the data in the column associated with measure 204A by the data in the column associated with attribute 204C. For example, instruction 208B may request that revenue data be grouped by state.

Instructions 208A and 208B may be combined into a search object and sent to the BI server in response to the transition to logic state 202D. Instructions 208A and 208B may be any annotation, instruction, text, message, list, pseudo-code, comment, or the like, or any combination thereof that is, or can be, converted into structured search instructions for retrieving data from the in-memory database system.

The BI server converts the search object containing instructions 208A and/or 208B into structured search instructions understood by the in-memory database system. For example, the BI server may translate the search object into instructions similar to SQL code. The BI server submits the structured search instructions to the in-memory database system and receives data for the identified columns. The data is then displayed in the user interface.

Thus, the search engine uses state machine 200 in combination with index 190 in FIG. 4 to guide users with no knowledge of structured query languages in constructing a search query that retrieves data from a structured relational database. The tokens used by the retrieval system are extracted from data that currently exists in the relational database system. Thus, the search suggestions offered by the retrieval system and the search queries formed from the user inputs access specific data that currently exists in the database system.

Figure 6:
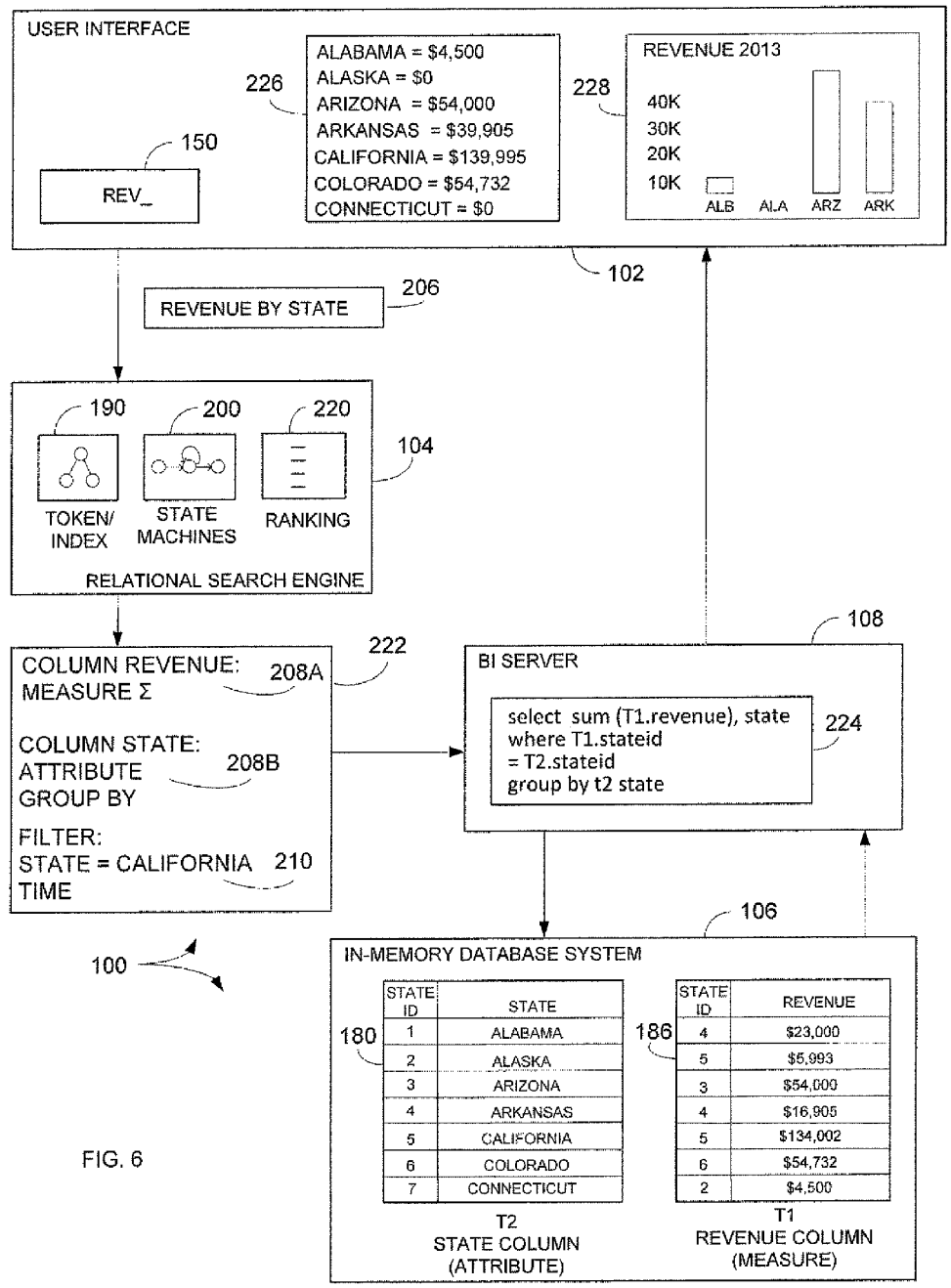
FIG. 6 depicts an example process flow for the information retrieval system.

FIG. 6 depicts in further detail an example of operations performed by information retrieval system 100. A user enters portions of search term 206 into search field 150 of user interface 102. The portions of search term 206 are analyzed by search engine 104. For example, index 190, state machine 200, and a ranking algorithm 220 may analyze each character entered into search field 150. As explained above, based in the data identified in database system 106, search engine 104 may anticipate, predict, suggest, and/or direct the user to available data as the user is entering search term 206.

Search engine 104 may generate a search object 222 for different logic states of search term 206. For example, search engine 104 may generate a first search object 222 after detecting the measure search term "revenue." The search engine 104 may generate a second search object 222 after the user completes entering the entire search term "revenue by state". In this example, search object 222 comprises pseudo-code, instructions, text or some other type of message 208A that identifies the matching revenue token associated with measure column 186 in database system 106. Instruction 208A also includes an operator indicating the revenue data should be summed together.

In this example, search object 222 also includes an instruction 208B that identifies the matching state token associated with state attribute column 180 in database system 106. Instruction 208B also includes an operator indicating the revenue data in column 186 should be grouped according to the attributes in state column 180.

Search object 222 may include any other information needed for generating structured search query instructions. For example, search engine 104 may include instructions 210 for filtering the data based on an identified search term. For example, search term 206 may have included the value "revenue by state=California." Search engine 104 may generate filter instructions 210 in search object 222 such as "Filter 1: State=California." Search object 222 also may include instructions for displaying the retrieved data. For example, a time value may direct the BI server to plot the retrieved data on a time graph.

BI server 108 operates as a metadata server and as a query delivery server. The metadata server generates relational models that identify the locations and relationships for different tables, columns, and data within database system 106. BI server 108 may generate the relationship models from metadata extracted from the tables, columns, data, and link information in enterprise database. In another example, a system administrator may generate some of the relationship models.

The query delivery server portion of BI server 108 converts search object 222 into structured search instructions 224, sends instructions 224 to database system 106, and delivers the data retrieved from database system 106 to user interface 102. Structured search instructions 224 are based on the table, column, and/or data locations and relationships identified in the relational models. For example, the relational models in BI server 108 may indicate that revenue column 186 is located in a table T1 within database system 106 and state column 180 is located within a table T2 of database system 106. BI server 108 generates structured search instructions 224 that reference the tables T1 and T2 containing columns 186 and 180, respectively.

Search engine 104 may include relational models for determining when queries can be processed. For example, search engine 104 may identify valid tokens that are associated with columns in database system 106. Search terms that do not correspond with valid tokens may be identified as invalid search requests.

In another example, the user may enter the term "revenue country" as the query. The search engine may determine the query is invalid because revenue comes from table T1 and country comes from table T2 and there is no relationship that connects table T1 and table T2. Thus, the search engine uses an awareness of the relationships between data elements to improve efficiency and effectiveness of user search queries.

Search engine 104 also may use relational models for resolving search ambiguities. A user query comprising valid tokens may potentially map to multiple tables or multiple columns in database system 106. In these examples, search engine 104 may ask the user for more information to disambiguate user search terms or may suggest alternative search terms.

For example, a user may enter the search term "products for California." Search engine 104 may determine that a first table or column exists for products sold in California and a second table or column exists for products produced in California. Search engine 104 may query the user to select between products sold and products produced.

Structured search instructions 224 also may include operators that indicate how database system 106 should process the identified data. For example, instructions 224 may include a sum operator that instructs database 106 to sum the data in revenue column 186 of table T1. Instructions 224 also may include a "group by operator" that instructs database 106 to group the revenue data in revenue column 186 of table T1 according to the state names contained in state column 180 of table T2. In one example, search instructions 224 may comprise or be similar to SQL instructions.

BI server 108 displays data retrieved back from database 106 within user interface 102. For example, BI server 108 may display a table 226 that identifies the total revenue for individual states. BI server 108 also may display the same data or different data in different formats, such as within bar graph 228.

BI server 108 may automatically change the format used for displaying data in user interface 102 based on the parameters and dimensions of the associated data in database system 106. For example, state column 180 may have a relatively few number of entries and revenue column 186 have a relatively large number of entries.

BI server 108 may determine that bar graph 228 is the best format for displaying the data from columns 180 and 186 and may determine that the relatively few entries in state column 180 should be displayed on the x-axis of bar graph 228 while the relatively large number of entries in revenue column 186 should be displayed along the y-axis of bar graph 228. Of course BI server 108 may use other formats or criteria for displaying data.

BI server 108 also may display the data based on any filter values 210 identified in search object 222. For example, filter instruction 210 may direct BI server to only display revenue data for California or for a particular year.

BI server 108 may automatically and dynamically suggest additional filters based on the retrieved data. For example, the relational models generated by BI server 108 may identify other columns in database system 106 associated with column 180 and/or column 186. For example, a third column may include the same state identifiers used in columns 180 and 186. The third column may contain zip codes. BI server 108 may display a filter within user interface 102 that allows the user to filter the retrieved data by the different zip codes contained in the third column.

Figure 7:
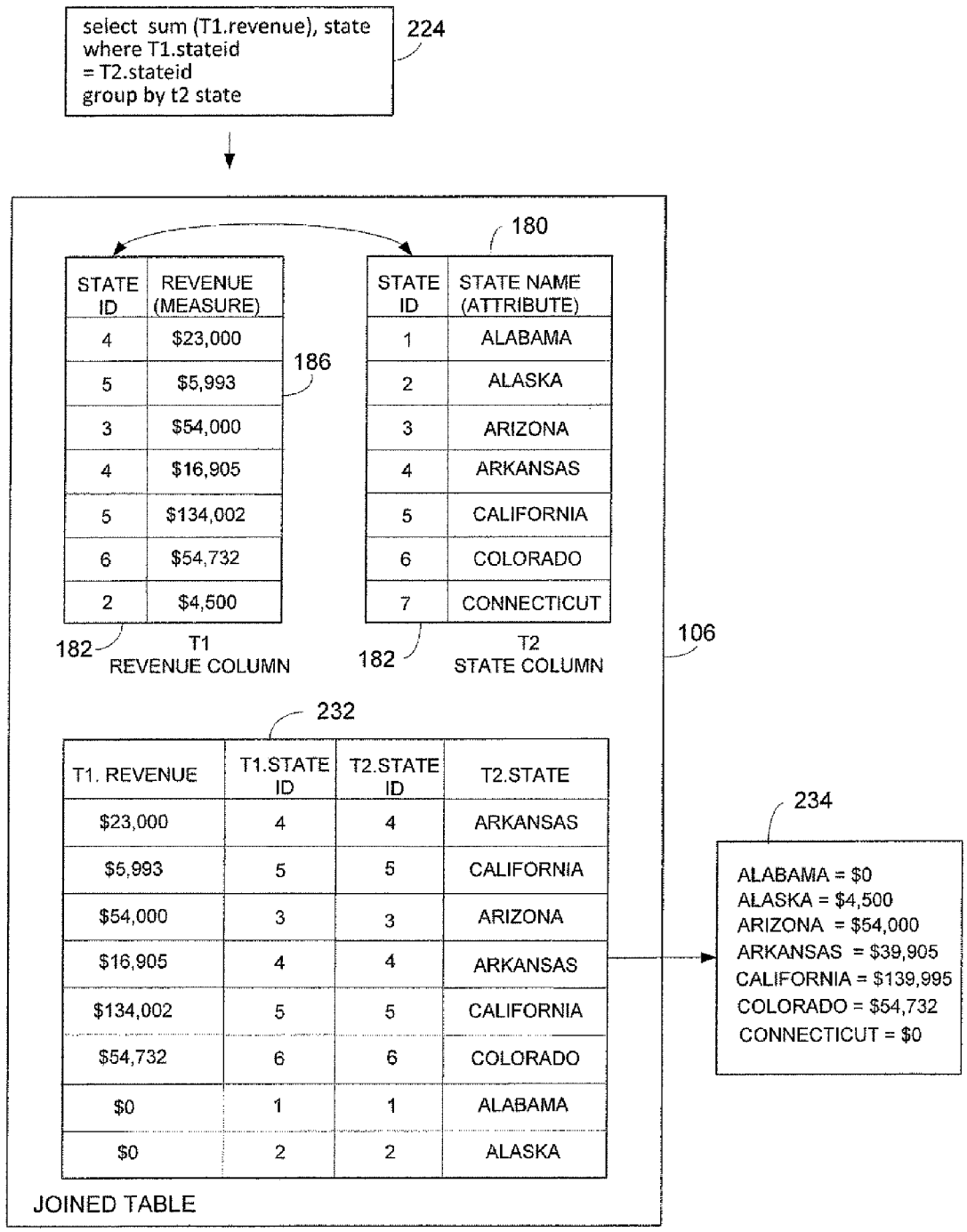
FIG. 7 depicts an example of how data columns are joined in an in-memory database system.

FIG. 7 depicts an example of how database system 106 may join revenue column 186 from table T1 with state column 186 from table T2 in response to structured search instructions 224. Database system 106 may join columns 186 and 180 by appending rows with common state identifiers 182. For example, the second row of state column 180 may include state identifier 2 associated with the attribute Alaska. The seventh row of revenue column 186 also may include the state identifier 2 associated with the measure $4,500. Database system 106 may join the data contained in the second row of column 180 in table T2 with the data contained in the seventh row of column 186 of table T1.

Database system 106 then may sum and group the joined columns based on operators in structured search instructions 224. For example, database system 106 may group together all revenue data associated with California state identifier 5 and sum the group of data together to generate a total of $139,995. Database system 106 may perform similar operations for the other entries in columns 180 and 186 to generate results 234. Database system 106 sends results 234 back to the BI server and the BI server then displays the results within the user interface.

Joined table 232 may be cached by a particular database coordinator operating in database system 106. The database coordinator that computes the final result may insert the results into the cache. If the BI server issues the same query to the same database coordinator, the BI server may receive the previously cached results. The BI server also may cache some results or may cache responses provided to the user interface instead of caching database query results.

Figure 8:
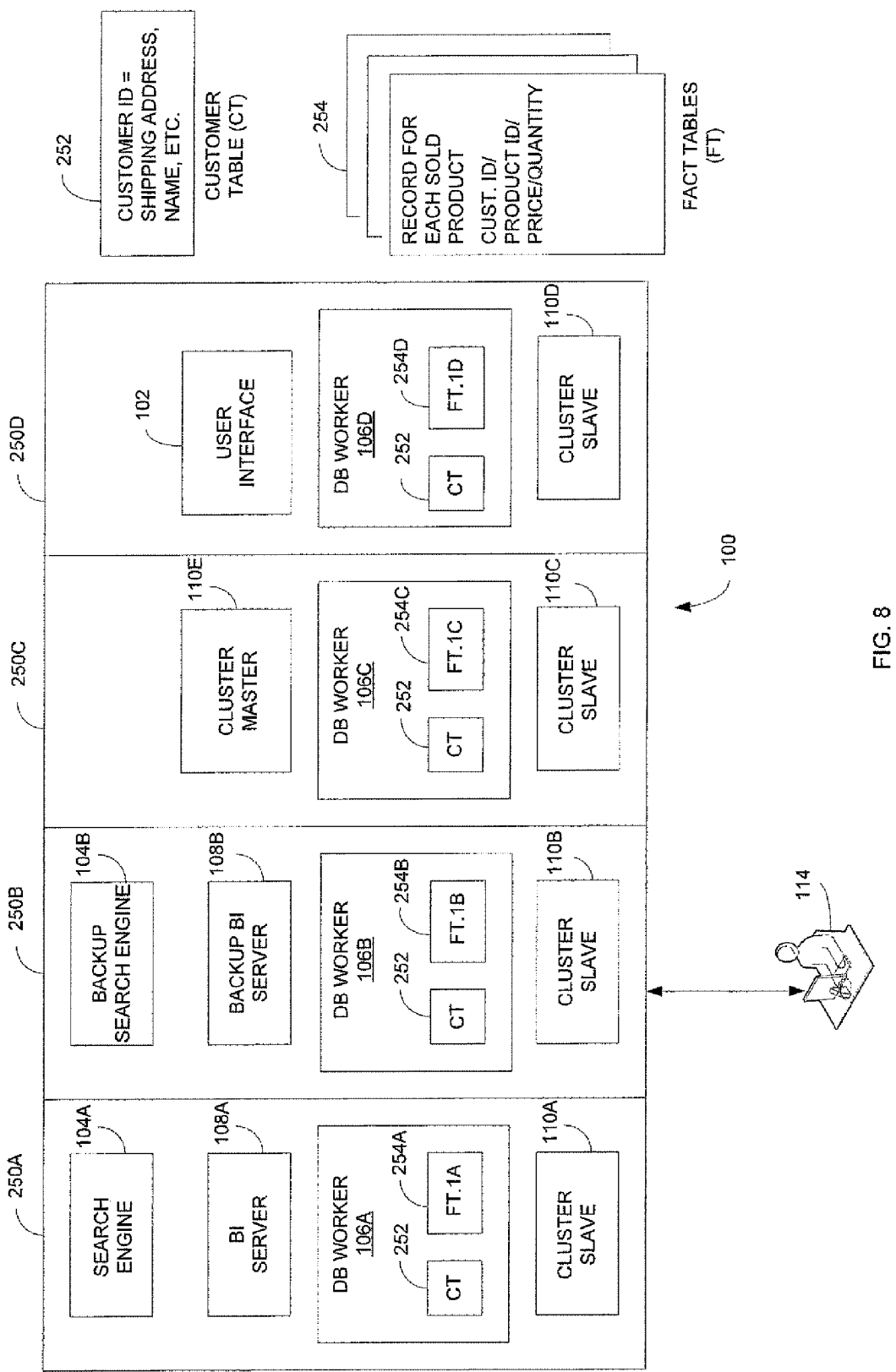
FIG. 8 depicts an example of how processes and data are distributed in the information retrieval system.

FIG. 8 depicts an example of how the information retrieval system 100 distributes both processes and data. The processes operating within information retrieval system 100 may be distributed across different computing devices and/or different processing threads to increase scalability, provide fault tolerance, and simplify system management.

Information retrieval system 100 may comprise multiple computing devices 250A-250D coupled together via networks or busses, such as a LAN network, wide area network (WAN), Internet network, fiber network, or the like or any combination thereof. In one example, computing devices 250 may comprise a combination of network servers and data servers. In another example, retrieval system 100 may comprise a single computing device, such as a network server, personal computer, mobile smart phone, notebook computer, or the like, or any combination thereof.

User interface 102 is loaded onto one of computing devices 250. A primary search engine 104A may operate on a first computing device 250A and a backup search engine 104B may operate on a second computing device 250. The search engine also may include multiple worker services. A primary BI server 108A may operate on a first computing device 250 and a backup BI server 108B may operate on a second computing device 250. The in-memory database system 106 may include multiple database workers 106A-106D operating on computing devices 250A-250D, respectively. Cluster manager 110 in FIG. 1 may comprise a cluster master 110E and multiple cluster slaves 110A-110D operating on computing devices 250A-250D, respectively.

Primary search engine 104A is alternatively referred to as search engine 104, primary BI server 108 is alternatively referred to as BI server 108, any combination of DB workers 106A-106D are alternatively referred to as database system 106, and any combination of cluster master 110E and cluster slaves 110A-110D are alternatively referred to as cluster manager 110.

Cluster manager 110 manages all of the different processes described above and may maintain a mapping table that indicates where the different processes are located on the different computing devices 250A-250D. The processes may use the mapping table for communicating with each other.

If a process goes down, cluster manager 110 may update the mapping table indicating that the failed process is no longer available. The mapping table may direct further communication to the backup process. For example, BI server 108A may fail. Cluster manager 110 may notify the other processes that BI server 108A is no longer available and may direct further communications to backup BI server 108B.

Cluster manager 110 also may start up new processes and update the mapping table with the locations of the new processes. For example, a new computing device 250 may be added to retrieval system 100. Cluster manager 110 may start new database workers or other processes on the new computing device 250. Cluster manager 110 updates the mapping table to include the new database workers. The updated mapping table notifies the other processes that new database workers are available for processing data.

Database workers 106A-106D within the in-memory database system 106 may process different portions of the same query. Some transactions and associated data may be frequently used. For example, thousands of customers may purchase products on-line each day. This large volume type of data may be stored in fact tables 254. For example, if an enterprise sold a billion products over ten years, there may be one billion associated entries in fact tables 254.

Some information associated with the one billion transactions may be stored in smaller customer tables 252. For example, each entry in fact table 254 may include a customer identifier and a product identifier. A customer table 252 may provide the detailed information associated with the customer identifier and the product identifier. For example, customer table 252 may include the name, home address, email address, phone number, etc. associated with the customer identifiers used in fact tables 254. Since an enterprise may have substantially more transactions over ten years, than new customers, fact tables 254 may be substantially larger than customer table 252.

Tables 252 and 254 are referred to as fact tables and customer tables, respectively, for explanation purposes. However, it should be understood that tables 252 and 254 could contain any data and could be any size. However, in one example, tables 254 may be substantially larger than table 252.

A copy of customer table (CT) 252 may be cached by each database worker 106A-106D and portions of the same fact tables (FTs) 254 may be cached by each database worker 106A-106D. For example, a first portion of fact table 254 (FT.1A) may be cached and processed by database worker 106A, a second portion of fact table 254 (FT.1B) may be cached and processed by database worker 106B, a third portion of fact table 254 (FT.1C) may be cached and processed by database worker 106C, and a fourth portion of fact table 254 (FT.1D) may be cached and processed by database worker 106D.

The user of computing system 114 may access user interface 102 and enter a search term requesting all sales transactions associated with a particular customer. Search engine 104 may generate a query object based on the identified search term and send the search object to BI server 108. BI server 108 may generate structured search instructions based on the search object received from search engine 104 and send the structured search instructions to database workers 106A-106D.

One of database workers 106A-106D may be selected as a query coordinator. For example, a round robin scheme, or some other priority scheme, may be used that selects database worker 106C as the query coordinator for the structured search instructions received from BI server 108. In another example, the retrieval system may use a hash function on the query to determine which query coordinator is selected for handling the query so that the similar queries are sent to the query coordinator with the previously cached results.

A query plan is generated by the query coordinator and sent to the different database workers 106. The query plan provides instructions to the database workers 106 for processing respective portions of the data. The query coordinator responsibilities may include the following.

1. Turn the query into a query plan. A database query expresses the desired results. A query plan specifies exactly what process to use to compute the result, and is built from a set of primitive operations supported by the database system, such as filter, aggregate, join, distribute etc.

2. Determine which database workers have appropriate data and send the query plan to the identified database workers 106A-106D.

3. Collect all the intermediate results from the database workers, put the results together and execute a part of the query plan that needs central combined and coordinated processing. As mentioned above, the database workers might send intermediate results to each other for further processing. Intermediate results can processed multiple times and the database workers may send final results to the coordinator for final consolidation.

4. Add the entry into a cache if appropriate and send the response back to the BI server.

Database workers 106A-106D each process the structured search instructions for their associated portions of fact table 254. For example, each database worker 106A-106D may join the customer table 252 associated with the search query with their associated portion of fact table 254 in response to the structured query instructions. Database workers 106A, 106B, and 106D each may send partial search results to the query coordinator in database worker 106C. The query coordinator may accumulate the joined table data generated by each of database workers 106A-106D.

For example, database worker 106A may determine that a customer in the search query purchased $350 of product A, database worker 106B may determine the customer purchased $250 of product A, database worker 106C may determine the customer purchased $500 of product A, and database worker 106D may determine the customer purchased $100 of product A. The query coordinator in database worker 106C combines the data from the different database workers and generates a joined table containing data indicating the customer purchased $1200 of product A. The query coordinator may cache the joined table in database worker 106C.

BI server 108 may keep a list indicating the data for the search query is cached in database worker 106C. If a similar query is received in the future, BI server 108 may reference the list and send the query to database worker 106C. BI server 108 can access the search data from the cache operated by database worker 106C without distributing the search query out to the other database workers 106A, 106B, and 106D.

Figure 9:
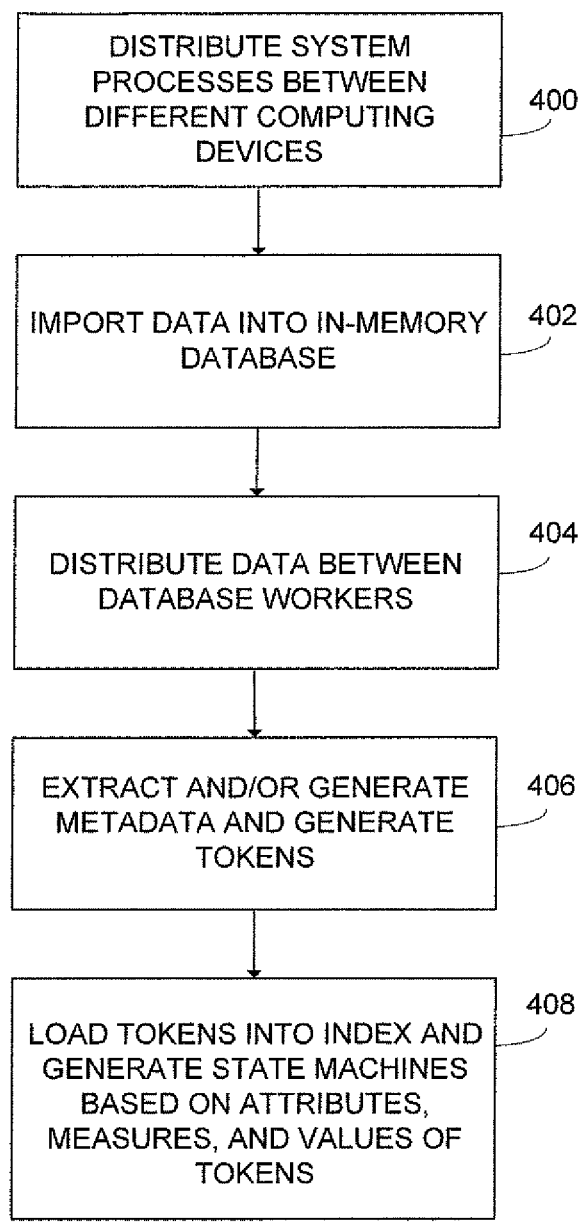
FIG. 9 depicts an example process for configuring the information retrieval system.

FIG. 9 depicts an example process used by the information retrieval system for distributing processes and structured data. Operation 400 distributes system processes among different computing devices of the information retrieval system. As explained above, the cluster manager may maintain tables indicating where the user interface, search engine, BI server and database system processes are located in different computing devices. The cluster manager may automatically update the tables whenever a process or processing device fails, moves, or is added to the information retrieval system.

Operation 402 imports data from the enterprise databases into the database system. In one example, the data is stored as logical columns in the database system. Operation 404 distributes different portions of the columns to the different database system processes and may link the different columns together based on metadata in the relational database. Columns may be associated with each other based on common identifiers and other parameters used in the enterprise database. For example, the relationship could be a primary key-foreign key relationship coming from the database or the relationship may be an association made by the retrieval system based on detecting common names, common values, or based on user inputs.

Operation 406 may extract some metadata from the enterprise database and/or may generate other metadata. For example, operation 406 may identify labels, keys, reference keys, foreign keys, tags, table names, fields, columns, variable names, links, etc. contained in the enterprise database. Operation 406 may use the metadata to generate tokens and classify the tokens as attributes measures, values, or any other data classification. For example, operation 406 may generate a token with the name "state" based on a column of data containing names of states and may generate tokens for each of the individual state names contained in the column.

Operation 408 may load the tokens into indexes and use the token classifications in state machines as described above for matching user inputs with attributes, measures, and values in the database system.

Figure 10:
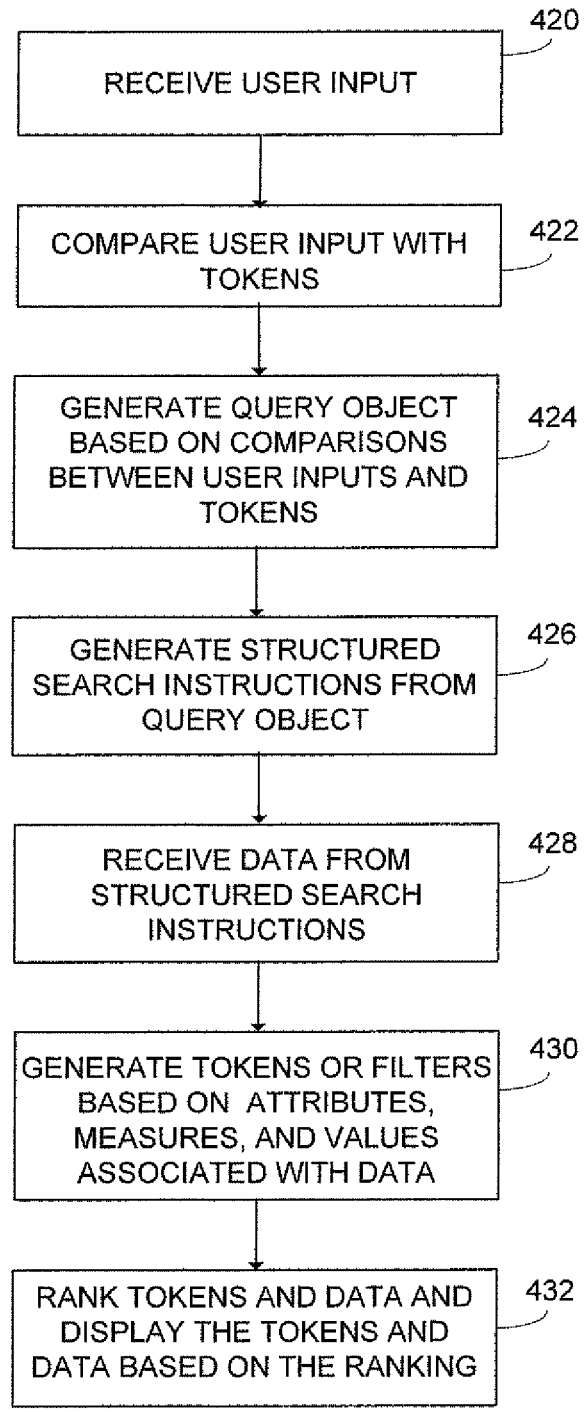
FIG. 10 depicts an example process for generating structured search instructions from ad-hoc user inputs.

FIG. 10 depicts an example process for retrieving structured relational data based on unstructured user inputs. Operation 420 receives a user input. The user input may comprise one or more characters entered into the search field of the user interface. Operation 422 compares the user inputs with the tokens generated from the relational database. For example, each character in the user input may be compared with characters in the tokens.

Operation 424 generates a query object based on the comparisons between the user inputs and the tokens. For example, a first character of the user input may match a first character of four different tokens. Operation 424 may generate a query object that requests the column data associated with all four tokens. The query object may identify the tokens and identify token classifications, such as an attribute, measure, or value. The query object also may identify operators such as, a group by operator, a summation operator, a standard deviation operator, an average operator, or a count operator.

Operation 426 generates structured search instructions based on the query object. For example, operation 426 may identify the tables and columns in the database system associated with the tokens identified in the search object. The structured search instructions retrieve and join the data in the identified tables and columns. The structured search instructions also may instruct the database system to perform functions identified by the operators in the search object.

Operation 428 receives the data back from the database system in response to the structured search instructions. Operation 430 may identify additional data, columns, attributes, measures, and values associated with the retrieved data. For example, the original user input may have included the search term "revenue." Data may have been retrieved from a revenue column associated with a matching revenue token. The revenue column may link to another state column via common identifiers that contains state attributes. Operation 430 may identify one or more tokens associated with the state column or may generate filters that may display the revenue data for different selected state names contained in the state column.

Operation 432 may display the data received back from the database system. For example, operation 432 may display a sum for all revenue in the revenue column and may display tokens associated with each entry in the state column Selection of a state token may display the revenue for the state associated with the selected token.

Figure 11:
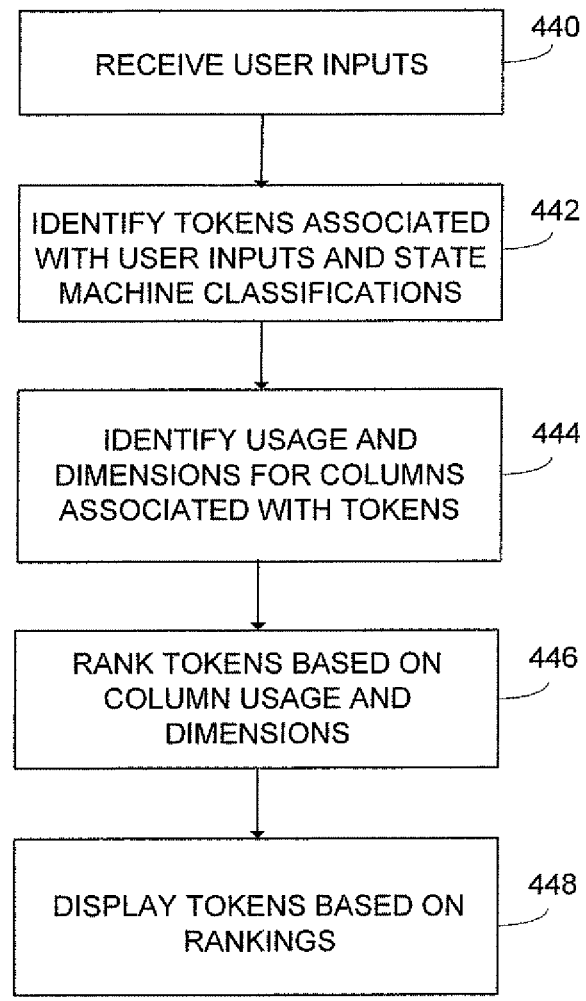
FIG. 11 depicts an example process for ranking and displaying tokens.

Operation 432 also may rank the data, tokens, and filters and display the data, tokens, and/or filters based on the ranking. For example, operation 432 may identify multiple columns associated with the search query. All columns may be ranked based on column dimensions and column usage. The data and/or tokens associated with the highest ranked columns may be displayed in the user interface FIG. 11 depicts an example process for predicting which search terms a user should use for retrieving structured data. Operation 440 receives the user inputs. Operation 442 identifies tokens associated with the user inputs. As explained above, tokens may be identified based on similarities between the characters in the user inputs and the characters in the tokens and the attribute, measure, and value classifications of the tokens. For example, the state machine may require the first search term to be an attribute. Operation 442 may accordingly only compare tokens classified as attributes with the first portion of the user input. Operation 442 may query the user for a clarification if the user input is ambiguous.

Operation 444 identifies the usage and dimensions of the columns associated with the identified tokens and operation 446 ranks the tokens based on the column dimensions and usage as described above. In another example, the tokens may be ranked based on user preferences. Operation 448 displays the tokens based on the rankings. For example, the highest ten ranked tokens may be displayed to the user.

Thus, the system predicts what structured data in the database system the user is trying to retrieve. The tokens are associated with data that currently resides in tables or columns of the database system. Therefore, using the tokens to form the search query will generate a specific answer to the search query.

Figure 12:
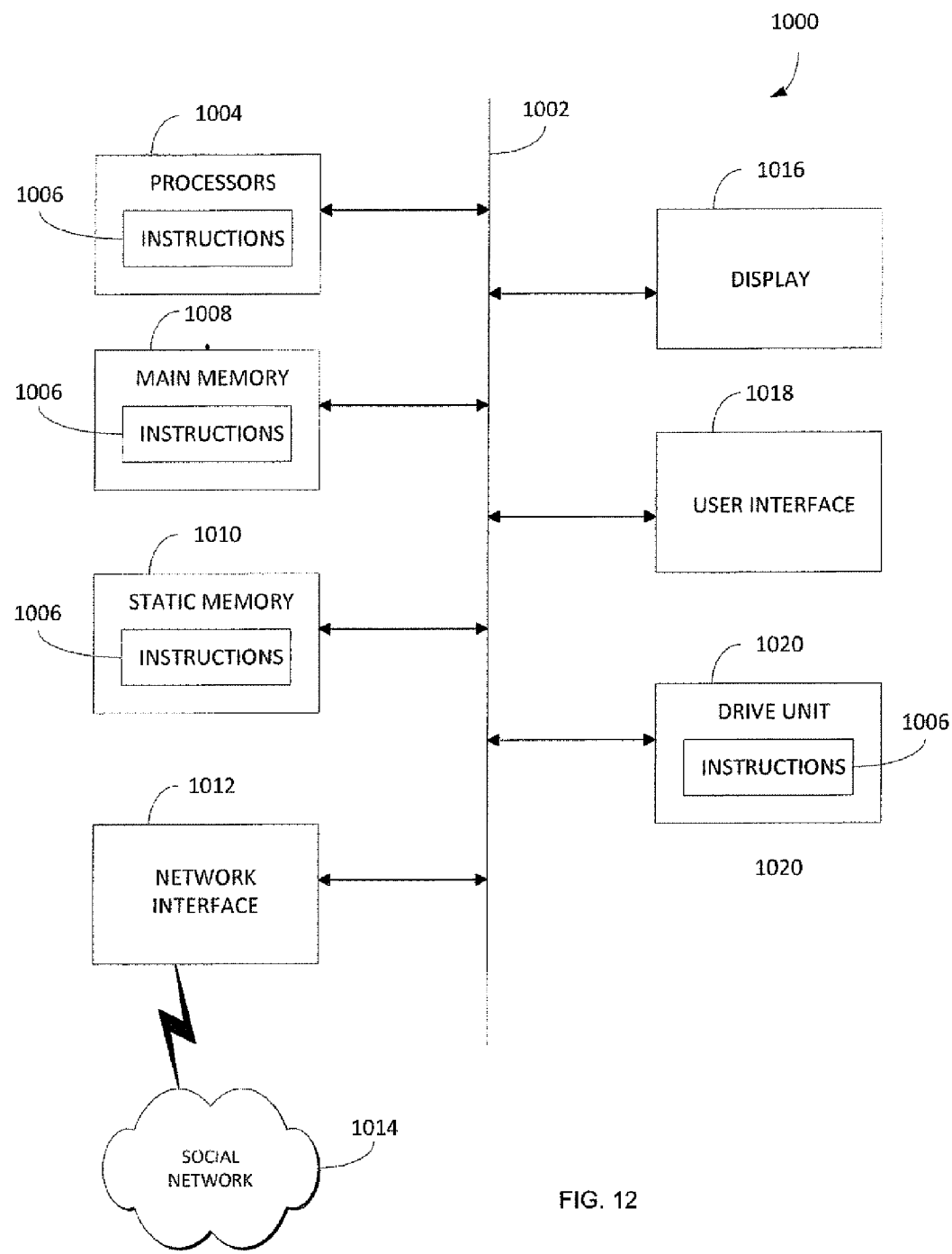
FIG. 12 depicts an example computing device for implementing the information retrieval system.

FIG. 12 shows a computing device 1000 that may be used for operating the information retrieval system and performing any combination of the information retrieval processes discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT)) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A method, comprising:
   identifying, by a computing device, characteristics of a relational database;
   generating, by the computing device, tokens from the characteristics of the relational database;
   receiving, by the computing device, a search request containing a search term entered into a field of a user interface;
   identifying, by the computing device, a set of the tokens associated with the search term;
   automatically generating, by the computing device, a structured query based on the set of the tokens associated with the search term;
   using, by the computing device, the structured query to retrieve data in the relational database;
   classifying the tokens as non-numeric attributes and numeric measures;
   identifying a first one of the tokens associated with the search term;
   identifying the first one of the tokens as one of the non-numeric attributes;
   identifying a first table associated with the first one of the tokens containing the non-numeric attributes;
   searching for a second table linked to the first table containing numeric measures;
   displaying a second one of the tokens associated with the second table; and
   displaying the numeric measures from the second table in response to identifying the first one of the tokens as one of the non-numeric attributes.

2. The method of claim 1, further comprising:
   identifying a first partial set of characters for the search term;
   identifying the tokens associated with the first partial set of characters; and
   displaying the tokens associated with the first partial set of characters.

3. The method of claim 2, further comprising generating the structured query based on the tokens associated with the first partial set of characters.

4. The method of claim 3, further comprising:
   identifying a second partial set of characters for the search term;
   identifying the e tokens associated with the second partial set of characters;
   displaying the tokens associated with the second partial set of characters;
   generating an additional structured query based on the tokens associated with the second partial set of characters; and
   displaying data retrieved from the relational database based on the additional structured query.

5. The method of claim 1, further comprising:
   identifying tables associated with the tokens;
   identifying dimensions of the tables;
   ranking the tokens based on the dimensions of the associated tables; and
   displaying the tokens based on the ranking.

6. The method of claim 5, further comprising ranking the tokens based on the dimensions and usage of the tables associated with the tokens.

7. The method of claim 6, further comprising:
   ranking the tokens associated with the tables having smaller dimensions higher than the tokens associated with the tables having larger dimensions, and
   ranking the tokens associated with the tables having high usage higher than the tokens associated with the tables having low usage.

8. The method of claim 1, further comprising:
   receiving a portion of the search request as an unstructured input;
   comparing the portion of the search request with the tokens; and
   suggesting some of the tokens for replacing the portion of the search request.

9. The method of claim 8, further comprising:
   detecting selection of one of the tokens;
   replacing the portion of the search request with the selected one of the tokens; and
   generating the structured query based on the selected one of the tokens.

10. A database system, comprising:
    a computing device configured to:
    identify content in the database system;
    generate tokens based on the content in the database system;

use the tokens to associate unstructured user inputs with the content in the database system, operate a search engine configured to generate search objects based on the tokens associated with the user inputs; and operate a business intelligence server configured to generate structured search instructions in response to the search objects for retrieving portions of the content from the database system, wherein the database system comprises multiple database processes configured to:

process the structured search instructions for different portions of the content;

join columns of the content based on the structured search instructions;

conduct operations on the content in the joined columns based on the structured search instructions;

send results for the operations to the business intelligence server; and, cache the joined columns.

11. The database system of claim 10, wherein the computing device is further configured to use the tokens to predict which columns of the database system are associated with the user inputs.

12. The database system of claim 10, wherein the computing device is further configured to:

identify the tokens associated with the user inputs;

rank the tokens based on usage and dimensions of the content associated with the tokens.

13. The database system of claim 10, wherein the computing device is further configured to:

form a structured query from the structured search instructions;

send the structured query to the database system;

receive the content back from the database system in response to the structured query;

identify dimensions of columns containing the content; and display the content in different formats based on the dimensions of the columns.

14. The database system of claim 13, wherein the computing device is further configured to:

identify different categories of the content contained in the columns; and generate filters for refining the structured search query based on the different categories.

15. The database system of claim 13, wherein the computing device is further configured to:

generate a ranking for the content based on the dimensions of the columns and usage of the columns; and display the data based on the ranking.

16. A computer-implemented method for retrieving data, the method comprising: at least one processor receiving an ad-hoc based search request;

generating words identifying contents of tables in a relational database;

identifying the words matching the search request;

identifying the contents in the relational database associated with the words matching the search request;

automatically generating a structured search query to retrieve the identified contents from the tables;

classifying the words as related to non-numeric attributes or numeric measures;

identifying a first one of the words associated with the search request;

identifying the first one of the words as one of the non-numeric attributes;

identifying a first one of the tables associated with the first one of the words containing the non-numeric attributes;

searching for a second one of the tables linked to the first table containing numeric measures;

displaying a second one of the words associated with the second one of the tables; and displaying the numeric measures from the second one of the tables.

17. The computer-implemented method of claim 16, further comprising:

receiving a partial set of characters from the search request;

predicting the words associated with the search request based a comparison of letters in the words with the partial set of characters and further based on the attributes or measures associated with the words; and displaying the words predicted as associated with the search request.

18. The computer-implemented method of claim 17, further comprising:

generating a query object based on the words predicted as associated with the search request;

translating the query object into a preliminary structured search query; and displaying the contents in the relational database retrieved in response to the preliminary structured search query.

* * * * *